No. 65,954.

F. SCHMIDT.
WOOD PLANING MACHINE.

PATENTED JUNE 18, 1867.

Witnesses.

Inventor.
Frederick Schmidt

United States Patent Office.

FREDERICK SCHMIDT, OF CINCINNATI, OHIO.

Letters Patent No. 65,954, dated June 18, 1867.

IMPROVEMENT IN WOOD-PLANING MACHINES.

The Schedule referred to in these Letters Patent and making part of the same.

TO ALL WHOM IT MAY CONCERN:

Be it known that I, FREDERICK SCHMIDT, of Cincinnati, Hamilton county, State of Ohio, have invented a new and useful Improvement in the Method of Constructing Revolving Cutters for Wood-Moulding Machines; and I do hereby declare that the following is a full, clear, and exact description of the construction of the same, reference being made to the annexed drawings, making a part of this specification, in which—

Figure 3:
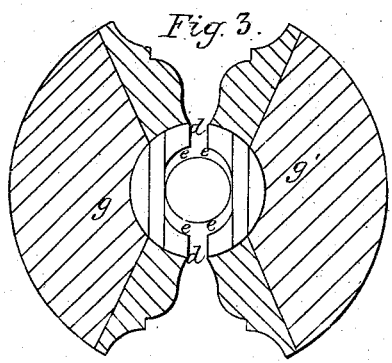
Figure 1:
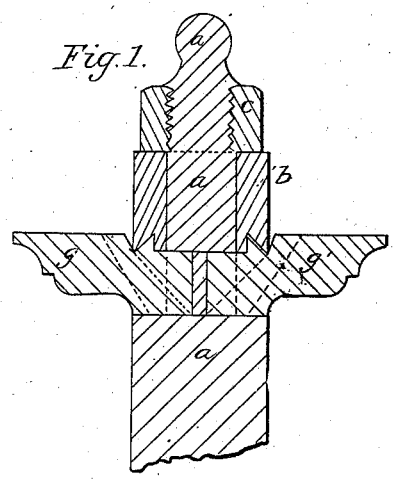
Figure 2:
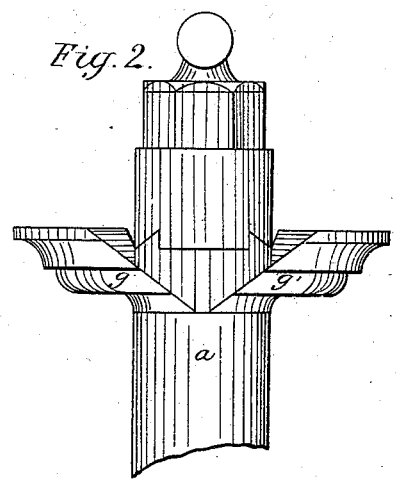

Figure 1 is a longitudinal section.
Figure 2, a side elevation; and
Figure 3 a transverse section.

In order that the construction of my improvement may be more fully understood, I will state that the usual way of making cutters for this purpose is to forge a piece of steel of proper size, drill a hole in the centre to fit the mandrel or spindle, and then turn it into the desired shape in order to give form to the wood upon which the moulding is to be made. Then to give it cutting points or edges one-half of the steel is cut away, one-quarter on each side of the centre. This cutter when in motion and being used will rub all around the outer edge, and as it wears and becomes dull the outer edge or back behind the cutting points is left higher, which will cause the cutter to rub so hard against the moulding as to cause it to get hot, and draw out the temper and burn the moulding, and will require hard labor to make it cut.

In my improvement I construct the mandrel or spindle $a\ a\ a$, the washer $b$, and the nut $c$, in fig. 1, the same as are used in any ordinary moulding machine in which the mandrel revolves and carries the cutter with it. In making my cutter I turn off in the usual way a circular block of steel, whose axial contour is the counterpart of the transverse section of the desired moulding, and by means of the customary excavations $f$ I form two equal segmental parts, which I then separate in the plane $d\ d$ of their axes, so as to form two distinct and separate pieces $g\ g'$; and in place of the hole in the centre, as in the solid cutter, I make an elongated gain or depression, $e$, with rounded ends, half in each piece of the cutter, which gains or depressions form collectively an elongated hole or slot, as shown at $e\ e\ e\ e$, fig. 3. The object of this elongaced slot is that the pieces of the cutters may be set out in opposite directions so as to bring the cutting points in contact with the wood to be cut.

By making a cutter in this manner, I am enabled to retain twice the amount of steel that there is in the usual kind; and by being able to move either piece a little forward and off the centre or circle, no part of it will touch the wood but the cutting edge or points. It will never heat, and does not require half the labor to work it, and is far more durable than cutters made in the usual manner. The manner of operating my improvement is precisely the same as in any of the ordinary wood-moulding machines in use.

I am aware that rotary moulding cutters, consisting of a single piece of steel having one or more segmental cavities, have long been known and used under the name of "frizzing heads," and I therefore disclaim any exclusive right to such; but I claim herein as new, and of my invention—

The elongated gains or depressions $e\ e$ in the two parts of a divided cutter, to enable the said parts to be set out in opposite directions, substantially as and for the purposes set forth.

FREDERICK SCHMIDT.

Witnesses:
W. MARCHANT,
J. P. CUMMINGS.